United States Patent
Komoda et al.

(10) Patent No.: US 6,219,054 B1
(45) Date of Patent: Apr. 17, 2001

(54) INFORMATION PROCESSING METHOD AND APPARATUS FOR PREPARING A GUI ON A CLIENT BY UTILIZING AN ELECTRONIC MAIL MESSAGE OR AN AGENT

(75) Inventors: Chifuyu Komoda, Yamato; Hiroshi Ueno, Tokyo, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/090,507

(22) Filed: Jun. 4, 1998

(30) Foreign Application Priority Data

Aug. 22, 1997 (JP) .................................................. 9-226568

(51) Int. Cl.⁷ ............................................. G06F 3/00
(52) U.S. Cl. ........................................ 345/353; 345/334
(58) Field of Search .................................. 345/352–354, 345/326, 340, 346, 333, 334, 335, 353; 395/650, 683, 700, 200.3, 200.43, 346–349, 326, 684

(56) References Cited

U.S. PATENT DOCUMENTS

| | | | |
|---|---|---|---|
| 5,603,031 | 2/1997 | White et al. | 395/683 |
| 5,678,042 * | 10/1997 | Pisello et al. | 395/610 |
| 5,694,546 * | 12/1997 | Reisman | 395/200.9 |
| 5,706,334 * | 1/1998 | Balk et al. | 379/67 |
| 5,712,978 * | 1/1998 | Lerner et al. | 395/200.11 |
| 5,727,174 * | 3/1998 | Aparico, IV et al. | 395/348 |
| 5,734,837 * | 3/1998 | Flores et al. | 395/207 |
| 5,740,231 * | 4/1998 | Cohn et al. | 379/89 |
| 5,748,875 * | 5/1998 | Tzori | 395/183.05 |
| 5,768,510 * | 6/1998 | Gish | 395/200.33 |
| 5,778,377 * | 7/1998 | Marlin et al. | 707/103 |
| 5,781,614 * | 7/1998 | Brunson | 379/88 |
| 5,790,793 * | 8/1998 | Higley | 395/200.48 |
| 5,793,966 * | 8/1998 | Amstein et al. | 395/200.33 |
| 5,870,089 * | 2/1999 | Fabbio et al. | 345/335 |
| 5,870,464 * | 2/1999 | Brewster et al. | 379/219 |
| 5,877,759 * | 3/1999 | Bauer | 345/339 |
| 5,878,398 * | 3/1999 | Tokuda et al. | 705/8 |
| 5,917,489 * | 6/1999 | Thurlow et al. | 345/347 |
| 5,933,816 * | 8/1999 | Zeanah et al. | 705/35 |

FOREIGN PATENT DOCUMENTS

11015664 * 6/1997 (JP) .................................. G06F/9/44

OTHER PUBLICATIONS

Paper, Keith D. Kotay and David Kotz, Transportable Agents, Department of Computer Science Dartmouth College Hanover, NH 03755–3510, p. (1–4), Published Nov. 10, 1994.*

Paper, Hiroyuki Tarumi and Koji Kida and Yoshihide Ishiguro and Kenji Yoshifu and Takayoshi Asakura, WorkWeb System—Multi–Workflow Management, Department of Information Science, Graduate School of Engineering, Kyoto University, Japan, 1997.*

* cited by examiner

*Primary Examiner*—Jeffery Brier
*Assistant Examiner*—G. F. Cunningham
(74) *Attorney, Agent, or Firm*—Wayne Ellenbogen; Perman & Green, LLP

(57) ABSTRACT

A system for preparing a graphical user interface (GUI) on a client by utilizing an electronic mail message or an agent is provided. In one embodiment, a client (300) includes a client agent manager (330), a script interpretation part (320) and a client application (310), while a server includes a server agent manager (360) and a network service. The client (300), upon receiving an input request, retrieves a script corresponding to the same input request stored in a storage device (322) in the client (300). When the corresponding script is found on the storage device (322) as a result of the retrieval, the corresponding script is utilized to display a GUI containing the content requested by a user.

14 Claims, 14 Drawing Sheets

INFORMATION PROCESSING METHOD AND APPARATUS FOR PREPARING A GUI ON A CLIENT BY UTILIZING AN ELECTRONIC MAIL MESSAGE OR AN AGENT

BACKGROUND OF THE INVENTION

1. Field of the Invention

This invention relates to an information processing method and, in particular, to a method for preparing a graphical user interface (GUI) on a client by utilizing an electronic mail message or an agent.

2. Description of Related Art

In order to prepare a user interface, particularly a graphical user interface (GUI) on a client personal computer (PC) which is in a remote environment, it is typically necessary to prepare binary codes executable on the PC for use in development. The executable binary codes are then loaded on the client PC for execution. As referred to herein, a "GUI" (Graphical User Interface) is a screen format which allows a user to initiate a command, start a program or view a list of files by using a pointing device to point to and to select a screen expression (icon) or a menu item on the screen. Typically, the pointing device is a keyboard or a mouse.

While there are methods for automatically generating GUIs by utilizing a hypertext markup language (HTML) such as, for example, by utilizing a browser program called Netscape Navigator (a trademark of Netscape), a client PC has to have a compatible browser and sufficient memory capacity to display the generated GUI. Often the memory capacity required to operate the browser is such that a PC having a small memory capacity will not operate.

Thus, a new GUI containing, for example, a service content can be modified by a server, or other host side device (in a network service environment), such that the modified GUI consumes a large amount of memory and can not be displayed on all of the client PCs, or personal digital assistants (PDAs), requiring service.

In addition, since different clients may have different programs for displaying GUIs in the prior art, a server is required to send a program describing a displayed content which conforms to a GUI display program possessed by each client being served by the server. In other words, as many different GUI display programs as the kinds of GUI display programs which users are using have to be prepared by the server. It can be appreciated that this can result in a significant expenditure of time and of labor at the server.

Also, if there is no mechanism to identify each type of PC being served by the server, then it may not be possible to provide a display corresponding to each client PC.

In the case of a conventional browser program, on the other hand, every input from a user has to be communicated on-line which results in a heavy load between a client and a server. Further, if a communication path is disconnected due to an accident, such on-line processing can not handle such input.

In view of the disadvantages of the prior art described above, it can be appreciated that it would be desirable to provide an improved technique for preparing a graphical user interface on a client device which overcomes these disadvantages.

OBJECTS AND ADVANTAGES OF THE INVENTION

It is a first object and advantage of this invention to provide an improved system for preparing a GUI on a client by utilizing an electronic mail message or an agent that overcomes the foregoing and other problems.

It is another object and advantage of this invention to provide a system for updating a GUI on a client PC simply by sending a single mail message (agent) which describes the content to be displayed from the server (host) side to each client PC.

It is another object and advantage of this invention to provide a system which enables a GUI corresponding to each client PC to be displayed even without a mechanism for identifying the type of each client PC which displays a GUI in the server (host) side.

It is another object and advantage of this invention to provide a system which can dynamically modify a GUI on a client PC having a mailer without a browser.

It is another object and advantage of this invention to provide a system for dynamically modifying a GUI which can be implemented in a client PC having a client agent manager device of a mobile computer agent system.

It is another object and advantage of this invention to provide a system for modifying a GUI which deals with an occasion where a communication channel is disconnected between a client and a server by utilizing a GUI corresponding to the user input which is retained on the client.

It is another object and advantage of this invention to provide a system which enables a GUI to be modified in which the traffic on a communication channel between the client and the server is decreased by utilizing a GUI corresponding to the user input which is retained on the client.

Further objects and advantages of this invention will become more apparent from a consideration of the drawings and ensuing description.

SUMMARY OF THE INVENTION

The foregoing and other problems are overcome and the objects of the invention are realized by methods and apparatus in accordance with embodiments of this invention, wherein an improved system is provided for preparing a graphical user interface (GUI) on a client device by utilizing an electronic mail message, or an agent.

To update a GUI which achieves the above objectives, a method is provided for executing the steps of: acquiring an input for a menu request selected by a user; and retrieving a result script correlated to the selected input for the menu request on the computer. When the result script is found on the computer as a result of the retrieval step, the method further includes the step of interpreting the retrieved result script according to a predetermined rule and displaying a GUI based on the result of interpretation.

When the result script is not found on the computer as a result of the retrieval, the method further includes the steps of: preparing an electronic mail message containing the acquired input for the menu request to transmit to a server computer; receiving at the computer an electronic mail message containing the result of processing which is sent from the server computer; extracting the result script from the electronic mail message received from the server computer; interpreting the extracted result script according to a predetermined rule; and displaying a GUI based on the interpreted result.

BRIEF DESCRIPTION OF THE DRAWINGS

The above set forth and other features of the invention are made more apparent in the ensuing Detailed Description of the Invention when read in conjunction with the attached Drawings, wherein.

Identically labeled elements appearing in different ones of the above described figures refer to the same elements but may not be referenced in the description for all figures.

DETAILED DESCRIPTION OF THE INVENTION

Embodiments of this invention are now described with reference to the drawings.

Figure 1:
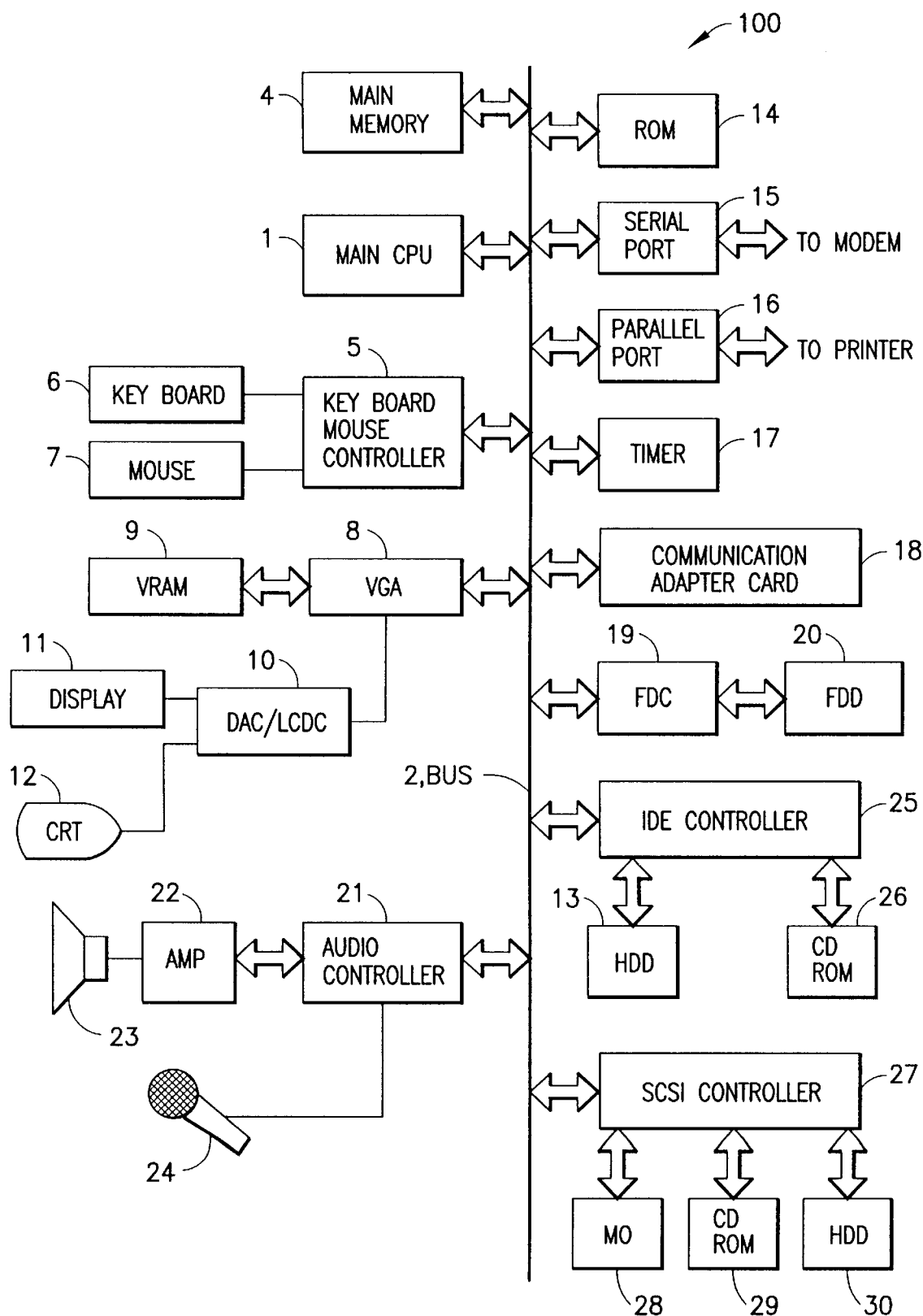
FIG. 1 is a block diagram showing an embodiment of a hardware configuration of a server or a client of this invention.

With reference to FIG. 1, a schematic diagram of an embodiment of a hardware configuration of a server which is used in this invention is shown. The server 100 comprises a central processing unit (CPU) 1 and a memory 4. The CPU 1 and the memory 4 are connected through a bus 2 to hard disk drives (HDD) 13 and 30 which are auxiliary storage devices. A floppy disk device (FDD) 20, or a recording medium drive such a MO 28 and a CD-ROM 29 is connected to the bus 2 via a floppy disk controller (FDC) 19, an IDE controller 25 or a small computer system interface (SCSI) controller 27.

A floppy disk, or a recording medium such as a MO and a CD-ROM, is inserted in to the floppy disk device 20 (or the recording medium drive such as the MO 28 or the CD-ROM 29). Computer program codes which give instructions in cooperation within an operating system to practice this invention may be recorded in the floppy disk device 20, the hard disk drives 13 and 30, or ROM 14 and executed by being stored in the memory 4. The computer program codes may be recorded in a plurality of media by being compressed or divided in to a plurality of pieces.

In addition, the server 100 may have user interface hardware including a pointing device (e.g., a mouse 7 or a joystick) or a keyboard 6 for input, and a display 12 for presenting visual data to the user. A touch panel may also be used as an input means. It is also possible to connect an external output device, for example a printer, via a parallel port 16, and a modem via a serial port 15. The information terminal supporting server 100 may be connected to the network through the serial port 15, the modem or a communication adapter 18, such as an Ethernet or Token-ring card, for communication with other computers.

A speaker 23 receives an audio signal which is digital/analog (D/A) converted by an audio controller 21 through an amplifier 22 for output as a voice. The audio controller 21 also analog/digital (A/D) converts an audio signal received from a microphone 24 to allow audio information external to the system to be inputted to the system.

As such, it can be readily understood that the information terminal supporting server 100 may be implemented in a form of a communication terminal with a communication capability including a conventional personal computer (PC), a work station, a notebook PC, a palm top PC and a network computer or a combination thereof. It should be understood, however, that these components are given as an example and that all of these components are not necessarily indispensable components of this invention.

The audio controller 21, the amplifier 22, the speaker 23 and the microphone 24 are necessary for processing voice. The keyboard 6, the mouse 7 and 4 keyboard/mouse controller 5 enable a direct input from an operator. The CRT 12, the display 11, VRAM 9 and VGA 8 present visual data to the user. Various storage media processing devices 19, 25 and 27 provide additional storage capabilities. Therefore, it can be appreciated that these hardware components are not necessarily indispensable components but describe an exemplary hardware configuration suitable for supporting various functions as specified by a user.

Modifications of the exemplary components of the information terminal supporting server 100 can include combining a plurality of machines and allocating functions to the machines as would be readily conceived by those skilled in the art and therefore are within the scope of the present invention.

A remote terminal, for example a client 210 (FIG. 2) used in this invention may be implemented by the hardware configuration shown in FIG. 1, that is the server 100. In other words, it can be readily understood that the remote terminal (client) 210 may be implemented in the form of a communication terminal having a communication function including a conventional personal computer (PC), a workstation, a notebook PC, a palm top PC, various home electronic devices including a television set having a computer installed therein, a game machine having a communication function, a telephone set, facsimile equipment, a portable telephone, a PHS, and an electronic notebook, etc., and a combination thereof because the remote terminal 210 requires only functions to input a mail key word and transmit it as an electronic mail message.

As noted above, these are example components and all of them are not necessarily indispensable components of this invention. For instance, as seen in a smart-phone, such as "Data Scope" made by Kyocera and "Pinocchio" made by Panasonic, and which has only send/receive functions, an output function like a display and a data transmitting/receiving function, as well as portable information terminal like a personal digital assistant (PDA) such as "Zaurus" made by Sharp, which are used as an informational terminal, the audio controller 21, the amplifier 22, the speaker 23 and the microphone 24 which are necessary for processing voice, the keyboard 6, the mouse 7, a pen (not shown) and keyboard/mouse controller 5 which enable a direct input from an operator, the CRT 12, the display device 11, VRAM 9 and VGA 8 for presenting visual data to the user and various storage media processing devices 19, 25 and 27, etc., are not necessarily indispensable components.

The operating system (OS) in the server 100 may include, for example, one which supports GUI multi-window environment as a standard, such as Windows NT (a trademark of Microsoft), Windows 95 (a trademark of Microsoft), Windows 3.x (a trademark of Microsoft), OS/2 (a trademark of IBM), MacOS (a trademark of Apple), and X-WINDOW system (a trademark of MIT) on AIX (a trademark of IBM). The OS may also be one which is in character base environment, such as PC-DOS (a trademark of IBM) and MS-DOS (a trademark of Microsoft), or a real time OS, such as OS/Open (a trademark of IBM) and VxWorks (a trademark of Wind River Systems, Inc). Alternatively, the OS may be an OS which is installed in a network computer, such as JavaOS, without being limited to any specific operating system environment.

The operating system in the remote terminal 210 may include, for example, one which supports GUI multi-window environment as a standard, such as Windows NT (a trademark of Microsoft), Windows 95 (a trademark of Microsoft), Windows 3.x (a trademark of Microsoft), OS/2 (a trademark of IBM), MacOS (a trademark of Apple), and X-WINDOW system (a trademark of MIT) on AIX (a trademark of IBM). The Os may also be one which is in character base environment, such as PC-DOS (a trademark of IBM) and MS-DOS (a trademark of Microsoft), or a real time OS, such as OS/Open (a trademark of IBM) and VxWorks (a trademark of Wind River Systems, Inc). Alternatively, the Os may be an OS which is installed in a network computer, such as JavaOS as well as a chip card OS as used in a smart-phone which can not handle a file without being limited to any specific operating system environment.

A system configuration in a preferred embodiment of this invention will now by described with reference to the block diagram of FIG. 2. In the preferred embodiment of this invention, the remote terminal (client) 210 is provided with a communication function such as a PHS and a portable telephone, etc. and is capable of getting an access to a server 200 which is connected to a network 250. In the preferred embodiment of this invention, a server agent manager 220 and an application program 230 operate on an OS 240 on the server 200.

The server agent manager 220 analyzes the content of an electronic mail message or an agent containing a script sent from the client 210 to generate a file on the server 200. The agent processing (executing) program 230 of the server 200 can perform various processing by utilizing this file. Transmission between an involved server and a client may be done by any of a wire communication using a telephone channel and a dedicated line, etc., a wireless communication using a portable telephone, PHS and infrared spectrum and carrying over a medium including a diskette and an MO.

As referred to in this specification and the drawings, a "script" is a job and an instruction requested by a user and the result of the job and the instruction requested by the user which are described in a predetermined rule and exchanged between the client and the server. A script used to request a job from the client to the server is herein specifically referred to as a "request script", while a script containing the result of the job requested which is sent back from the server to the client is specifically referred to as "result script".

When the application program is a mobile agent execution program, for example, it is possible to execute an agent which utilizes this file and accesses a host computer 261, a Notes server 263 (Notes is a trademark of Lotus) and a desk top PC 265 in home for acquiring information stored therein. For example, the acquired information can be that which is contained in a customer database held by the host computer 261, a manager's schedule information held in the Notes server 263, internet/intranet information on a material for a conference prepared on the home desk top PC 265.

Figure 2:
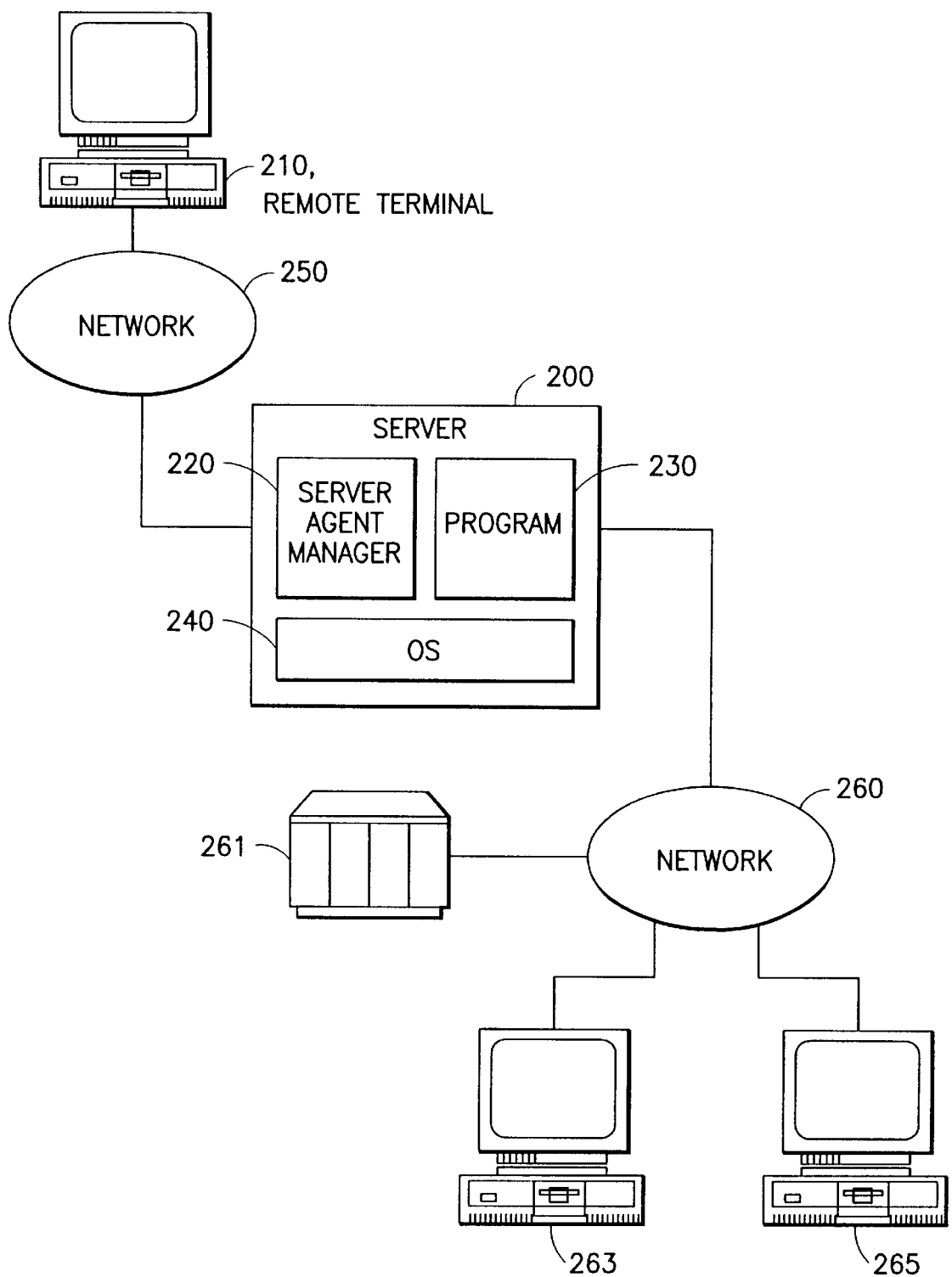
FIG. 2 shows an overall system in an embodiment of this invention.

While respective functional blocks in FIG. 1 and FIG. 2 have been described, they are logical functional blocks and it is not intended to mean that each of them is implemented by a single hardware device or software routine. It should be understood that they may be implemented by a compound or common hardware or software. It should be also noted that all the functional blocks shown in FIGS. 1 and 2 are not necessarily indispensable components of this invention.

A basic description of a prior art agent can be found in "Mobile Computer Agent Version J1.1 (Users Guide), $3^{rd}$ edition, October 1996, IBM Japan (SC88-3162-00)" and "Mobile Computer Agent Version J1.1 (Programming Reference), $1^{st}$ edition, October 1996, IBM Japan (SC88-3162-00)".

Figure 3:
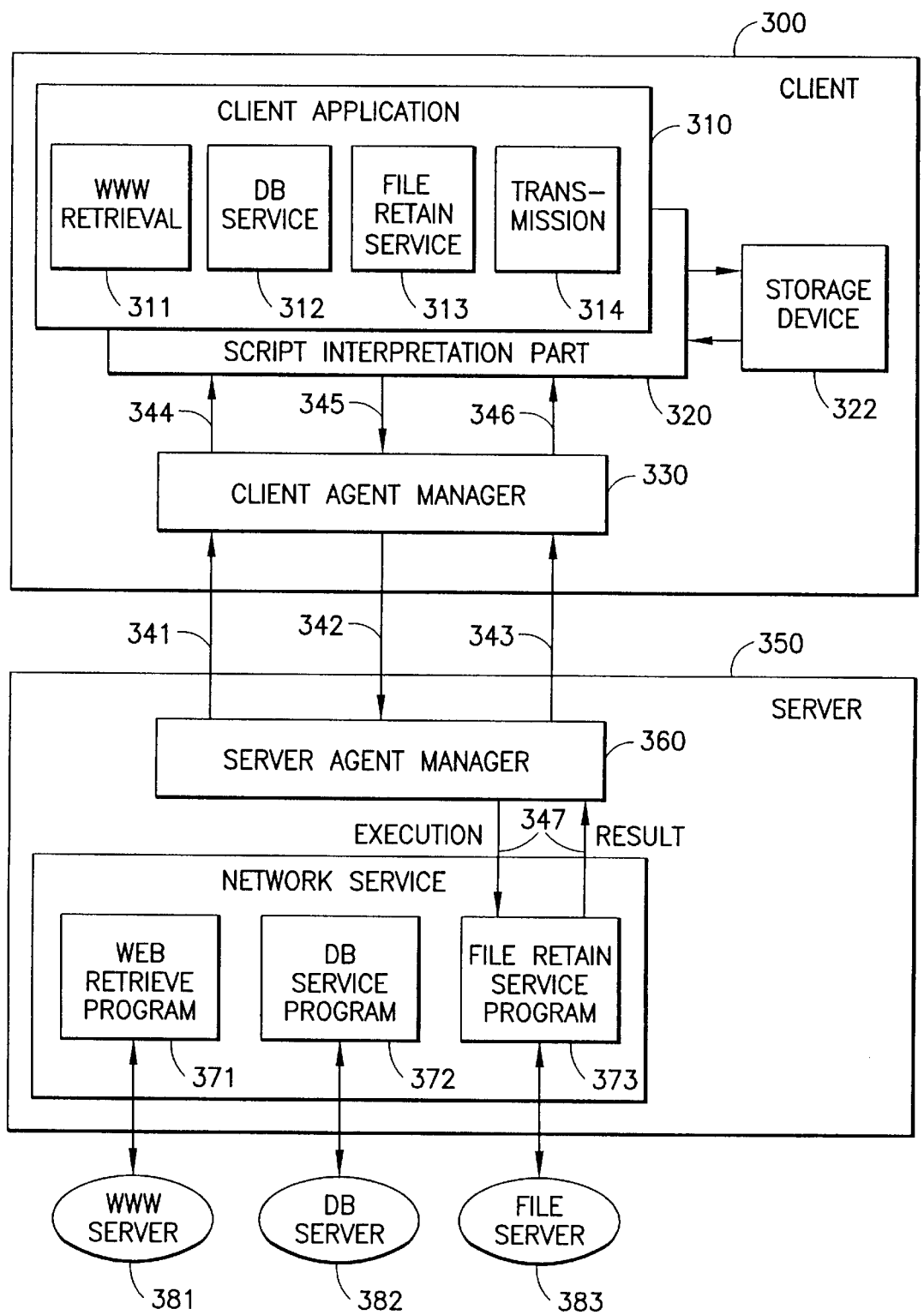
FIG. 3 shows a first embodiment of this invention which uses a client agent manager.

FIG. 3 is a functional block diagram showing a software configuration on a client terminal 300 and a server terminal 350 in the preferred embodiment of this invention.

In FIG. 3, the client 300 is shown in the upper half, while the server 350 is shown in the lower half. The client 300 comprises a client agent manager 330, script interpretation part 320, a storage device 322 and an application 310 as major functional components. The client agent manager 330 may be referred to as a message manager. The application 310 generally comprises a menu including worldwide web (WWW) retrieval 311, database (DB) service 312 and file retain service 313 as well as a display including a send button 314. The script interpretation part 320 stores a script in correlation with a user input in the storage device 322 and retrieves the script stored in the storage device 322 for initialization as required.

On the other hand, the server 350 comprises functional components such as a server agent manager 360 and a network service. The server agent manager 360 may be referred to as an agent event manager. In addition, a Web retrieval program 371, a DB (database) service program 372 and a file retain service program 373 are included as a network service. These network services are connected to a server which actually provides a service through an interface. For example, the Web retrieval program 371 is connected to a WWW server 381, the DB service program 372 is connected to a DB server 382 and the file retain service program 373 is connected to a file server 383, each through a dedicated interface.

Figure 10:
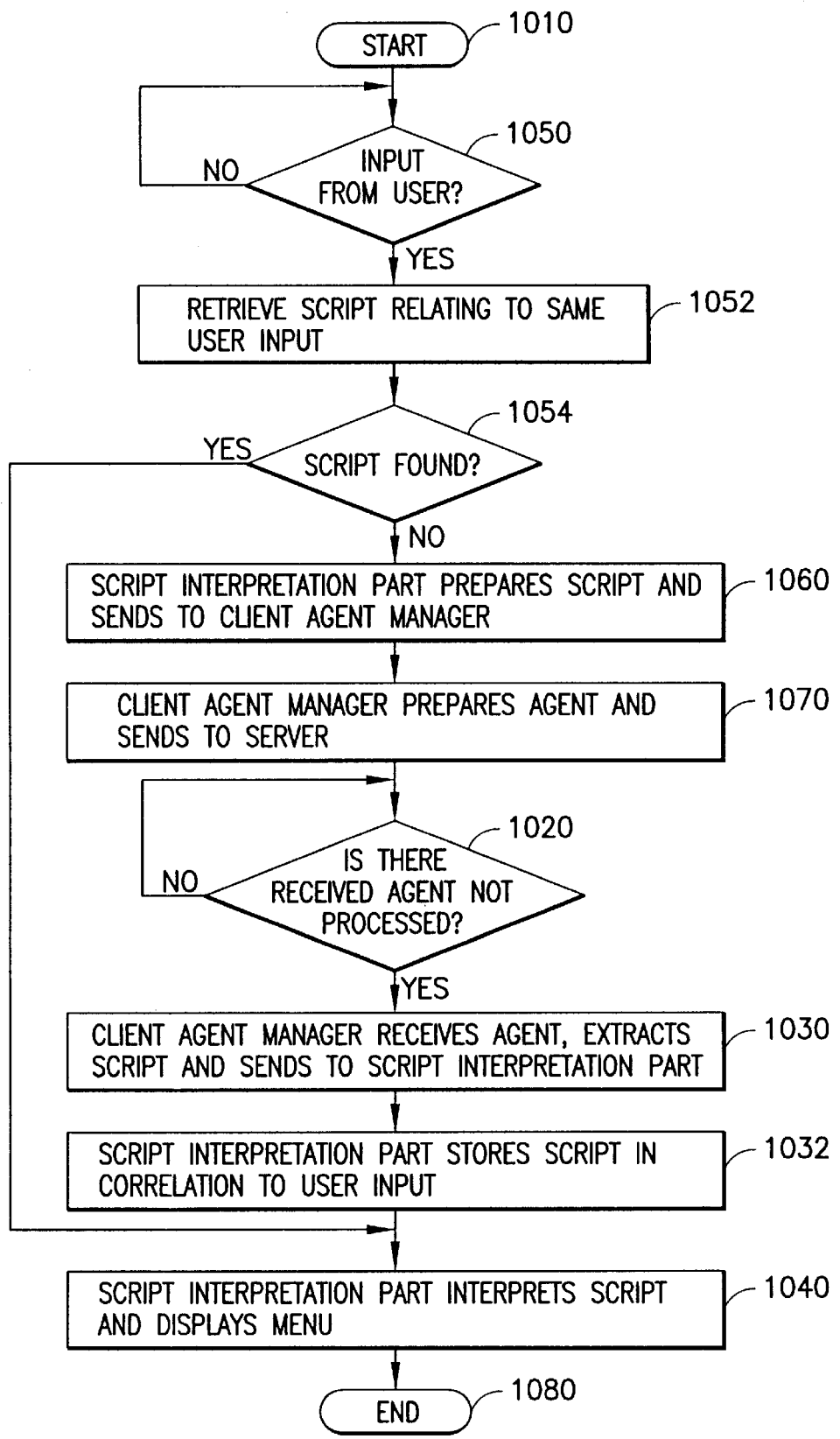
FIG. 10 is a flow chart showing a procedure of processing a display operation of a GUI on the client in the first embodiment of this invention.

Operation of the client 300 in FIG. 3 is now described with reference also to FIG. 10.

In the block 1050, the script interpretation part 320 checks if there is an input from a user corresponding to a menu now being displayed. Control stays in an input wait status if there is no input from the user (a "no" path from block 1050), while the control moves to a block 1052 if there is an input from the user (a "yes" path from block 1050).

In the block 1052, the script interpretation part 320 searches through the storage device 322 to see if a script relating to the same user input is stored.

In a block 1054, the control proceeds along a "yes" path to a block 1040 if the script being searched for is found as a result of the retrieval at block 1052, while control moves along a "no" path to a block 1060 if the script is not found.

In the block 1060, the script interpretation part 320 prepares a script for requesting the server 350 performs a job based on the input from the user, and sends the script to the client agent manager 330 at a block 1070. In the block 1070, the client agent manager 330 which receives the script prepares an agent containing the script and sends it to the server 350.

In a block 1020, the client 300 checks to see whether or not any agent received from the server 350 remains not processed. The client 300 waits until another agent is received if there remains no agent that is not processed. Control moves along a "yes" path to block a 1030 if there remains an agent that is not processed. In the block 1030, the client agent manager 330 receives an agent which is not processed and extracts the script part for sending it to the script interpretation part 320.

In a block 1032, the script interpretation part 320 stores the script in correlation to the user input in the storage device 322 on the client and makes it available by retrieving the script when the same user input is received later. In a block 1040, the script interpretation part 320 receiving the script executes interpretation of the script and displays a menu according to the result.

Figure 11:
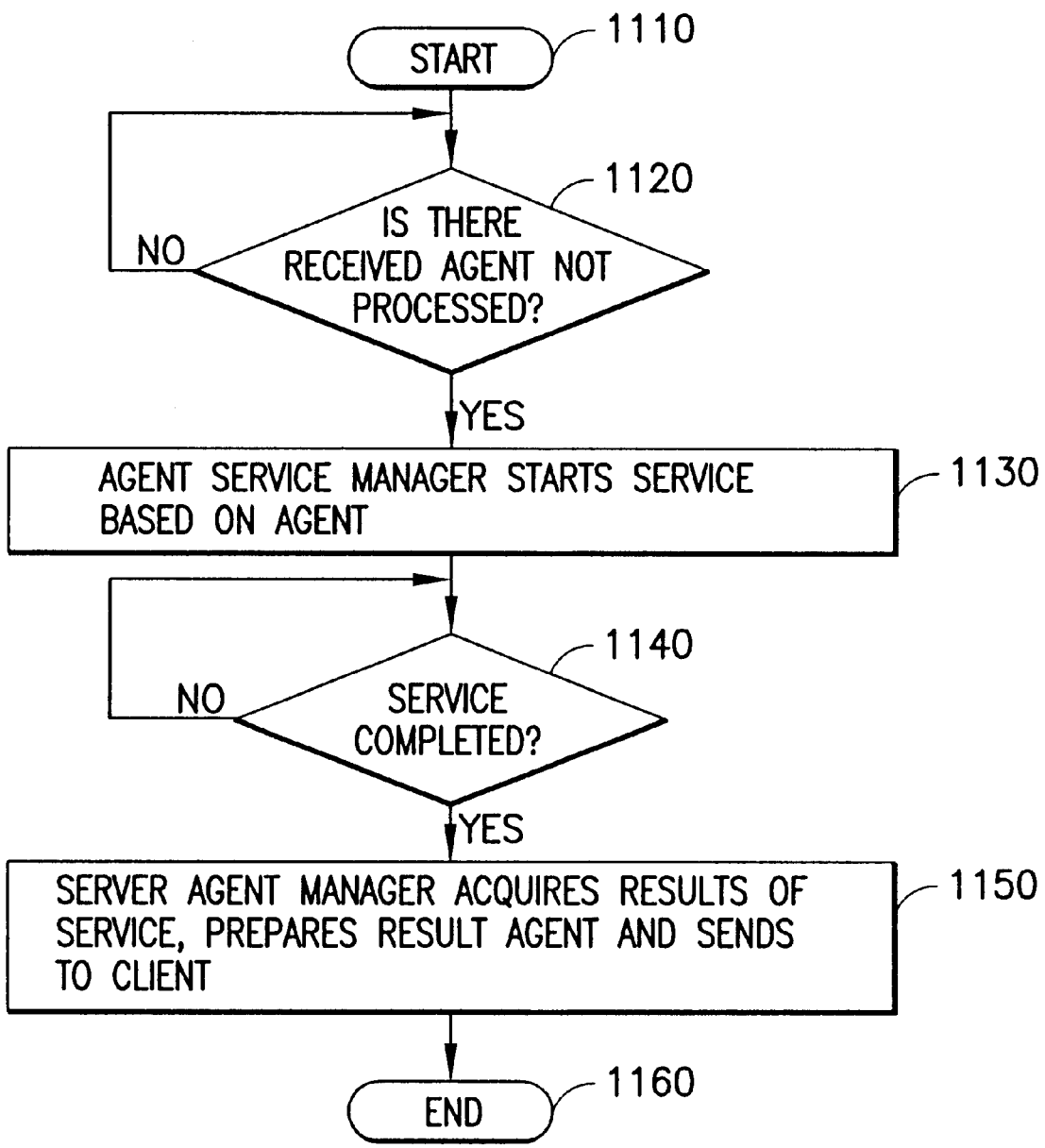
FIG. 11 is a flow chart showing a procedure of processing a display operation of the GUI on the server in the first embodiment of this invention.

Operation of the server 350 in FIG. 3 is now described with reference to FIG. 11.

In a block 1120, the server 350 checks to see if there remains any agent received from a client that is not processed. The server 350 waits until another agent is received if there remains no agent not processed, that is control moves back to block 1120 along a "no" path. The control moves to a block 1130 if there remains an agent not processed, that is, control moves along a "yes" path to a block 1130. In the block 1130, the server agent manager 360 initiates execution of a service by utilizing other servers (381, 382, 383) based on the agent received from the client 300.

In a block 1140, the server agent manager 360 waits for completion of the service initiated and, when service is completed, control moves along a "yes" path to block 1150. In the block 1150, the server agent manager 360 acquires the result of the completed service and prepares a result agent for sending it to the client 300.

Figure 4:
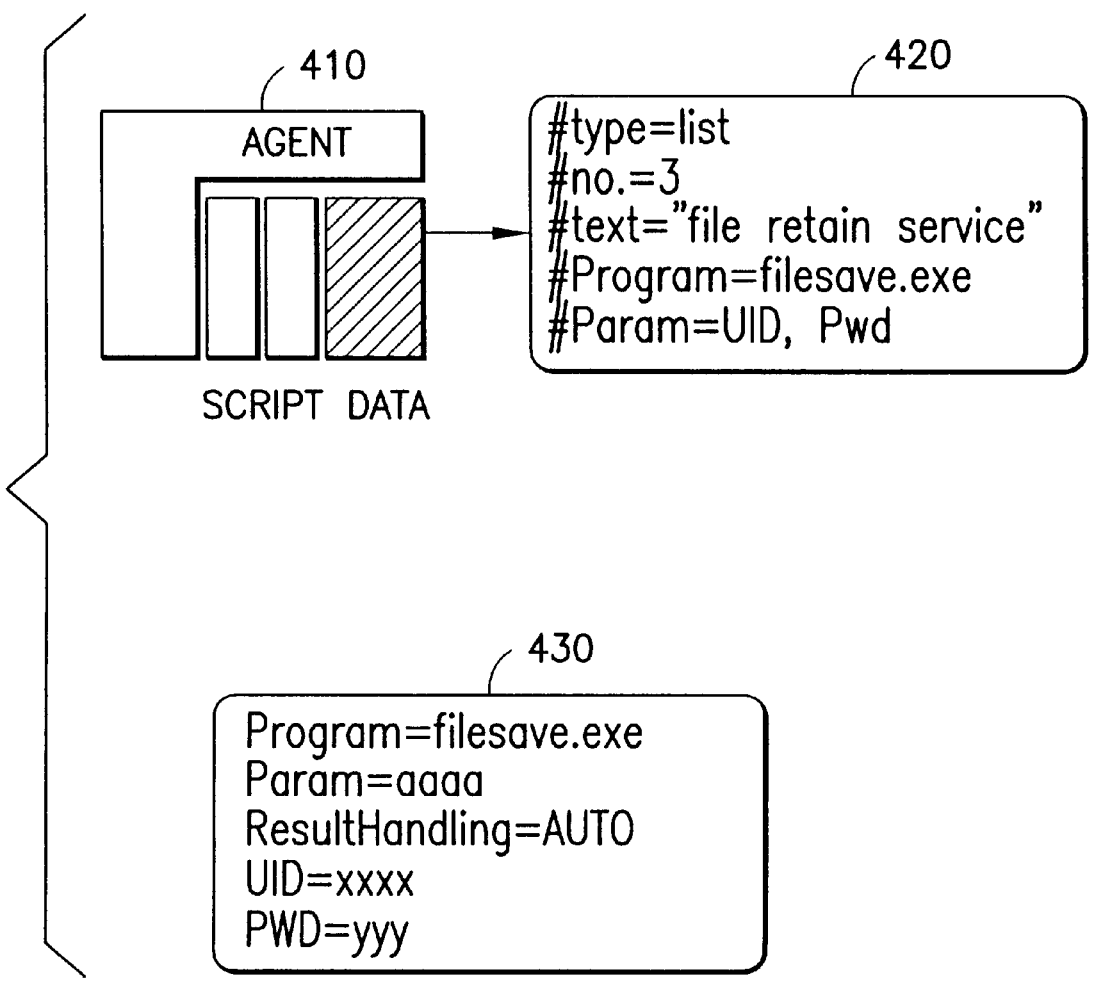
FIG. 4 shows a data form of the first embodiment of this invention.

FIG. 4 shows a form of data (format) which is handled on the client 300 and the server 350 in the configuration shown in FIG. 3.

In FIG. 3, the form of data transferred between the server 350 and the client 300 takes the form of an agent 410 containing script data 420 as shown in FIG. 4. Data 342 and 343 (FIG. 3) transferred between the client 300 and the server 350 also takes the form of a same agent as 341.

In FIG. 3, the form of data 344 sent from the client agent manager 330 to the script interpretation part 320 takes the form of the script portion extracted from the agent 410 of FIG. 4, as shown by block 420 of FIG. 4. The form of data 345 which the script interpretation part 320 receives as an input from the user is transferred to the client agent manager 330 as a script form. The script file 345 which the client agent manager 330 received from the script interpretation part 320 is converted to an agent containing script data for the agent. The agent is sent from the client 300 to the server 350.

As seen from the description using FIG. 4, data transfer is characterized in that an agent form is used in the data transfer between the server 350 and the client 300. A script form, however, is used in the data transfer between the client agent manager 330 and the script interpretation part 320 on the client 300.

Figure 5:
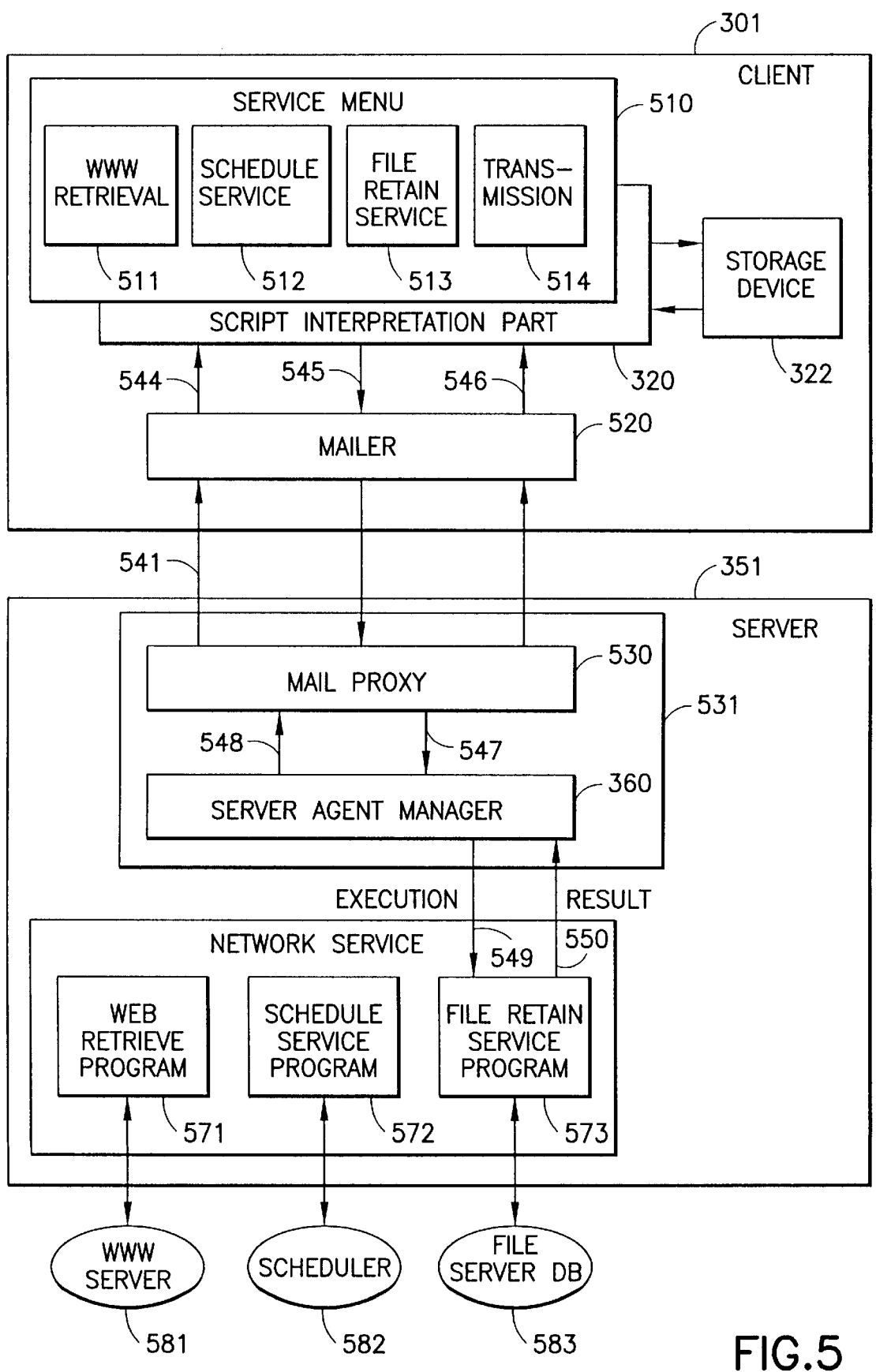
FIG. 5 shows a second embodiment of this invention which uses a mail proxy.

FIG. 5 is a block diagram of a software configuration on the client and the server in another embodiment of this invention. A client 301 is shown in the upper half, while a server 351 is shown in the lower half of FIG. 5.

The client 301 includes a mailer 520, the script interpretation part 320, the storage device 322 and a service menu 510 as major functional components. This embodiment is characterized in that the client 301 has the mailer 520 in place of the client agent manager 330 as shown in FIG. 3. The mailer 520 supports a conventional mail protocol, for example, SMTP on TCP/IP. In addition, a menu including WWW retrieval 511, a schedule service 512 and a file retain service 513 as well as a transmit button 514 are displayed in the service menu 510.

The script interpretation part 320 stores the script in correlation to a user input in the storage device 322 and retrieves the script stored in the storage device 322 for utilization as required.

The server 351 includes a mail proxy 530, a server agent manager 360 and a network service as major functional components. This embodiment is characterized in that the server 351 additionally has the mail proxy 530 when compared with the configuration of the server 350 in FIG. 3. The functional components including the mail proxy 530 and the server agent manager 360 are also referred to as a network service manager 531. In addition, a Web retrieval program 571, a schedule service program 572 and a file retain service program 573 are generally included as network services. Each of these network services is connected to a server which actually provides respective service through respective interfaces 581, 582, and 583, respectively. That is, the Web retrieval program 571 is connected to the WWW server 581, the schedule service program 572 is connected to the scheduler 582 and the file retain service program 573 is connected to the file server 583.

Figure 12:
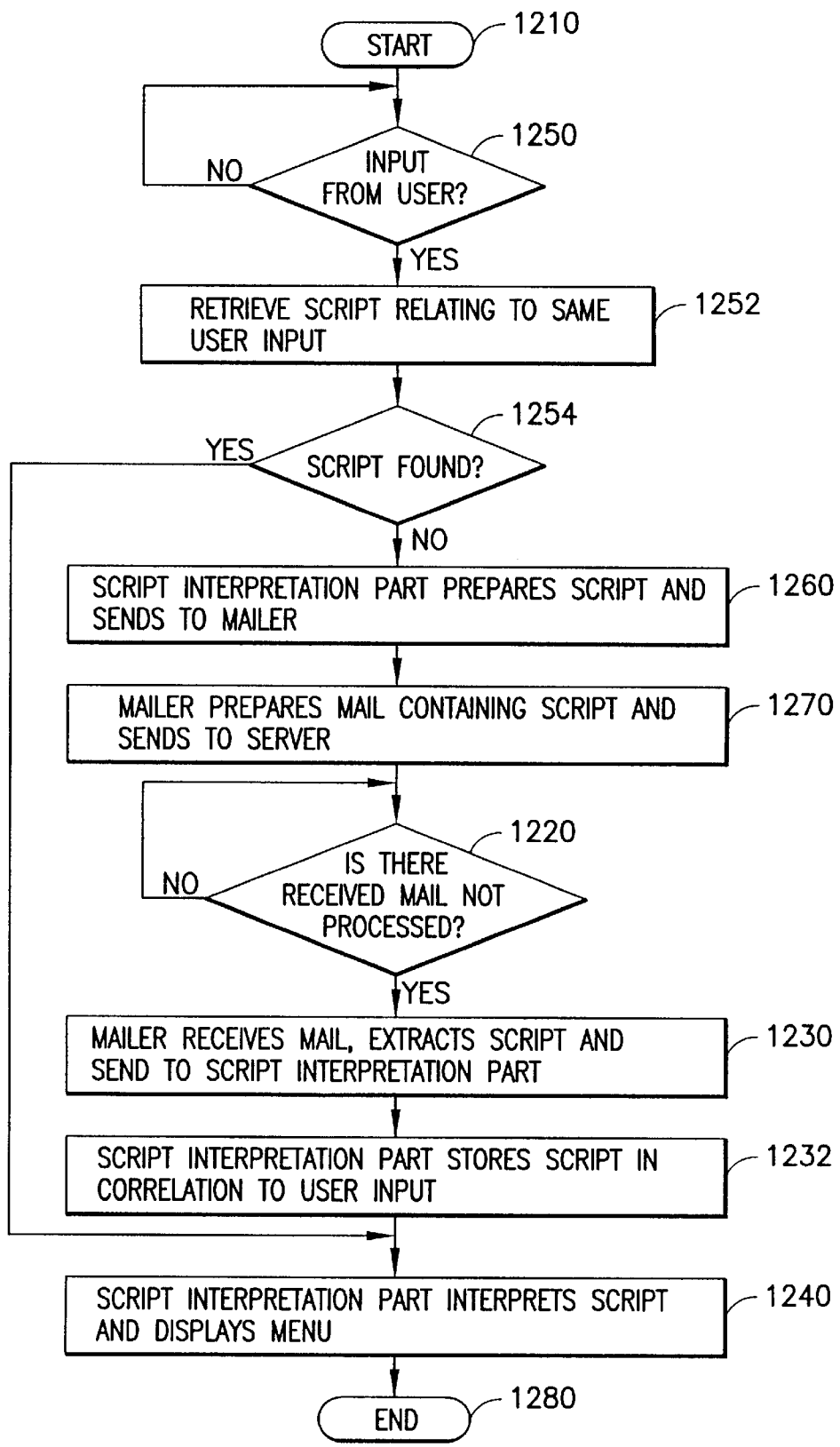
FIG. 12 is a flow chart showing a procedure of processing a display operation of a GUI on the client in the second embodiment of this invention.

Operation of the client 301 in FIG. 5 is now described with reference to FIG. 12.

In a block 1250, the script interpretation part 320 checks to see whether or not there is an input from the user corresponding to the menu now displayed. The script interpretation part 320 stays in the input waiting status if there is no input from the user, i.e. control moves along a "no" path to a block 1250. The control, however, moves along the "yes" path to a block 1252 if there is an input from the user.

In the block 1252, the script interpretation part 320 retrieves from the storage device 322 a script relating to the same user stored therein. In a block 1254, the control moves to a block 1240 along a "yes" path when the script to be retrieved is found in the storage device 322. The control moves along a "no" path to a block 1260 when the script retrieved is not found.

In the block 1260, the script interpretation part 320 prepares a script for requesting the server 351 to perform a job based on the input from the user and sends it to the mailer 520. In a block 1270, the mailer 520 receives the script, prepares a mail message containing the script, and sends it to the server 351. In a block 1220, the client 301 checks to see whether or not there remains a mail message received from the server 351 that has not been processed. The client waits as control moves along a "no" path until another mail message is received.

If there are no mail messages that are not processed the "no" path is traversed back to the block 1220, while control moves to a block 1230 by a "yes" path if there remains a mail message that is not processed.

In the block 1230, the mailer 520 receives a mail message that is not processed, extracts the script portion from the message and sends the script portion to the script interpretation part 320. In a block 1232, the script interpretation part 320 stores the extracted script in the storage device 322 in correlation to the user input. In a block 1240, the script interpretation part 320 receives the extracted script, executes an interpretation of the script and displays a menu according to the result.

Figure 13:
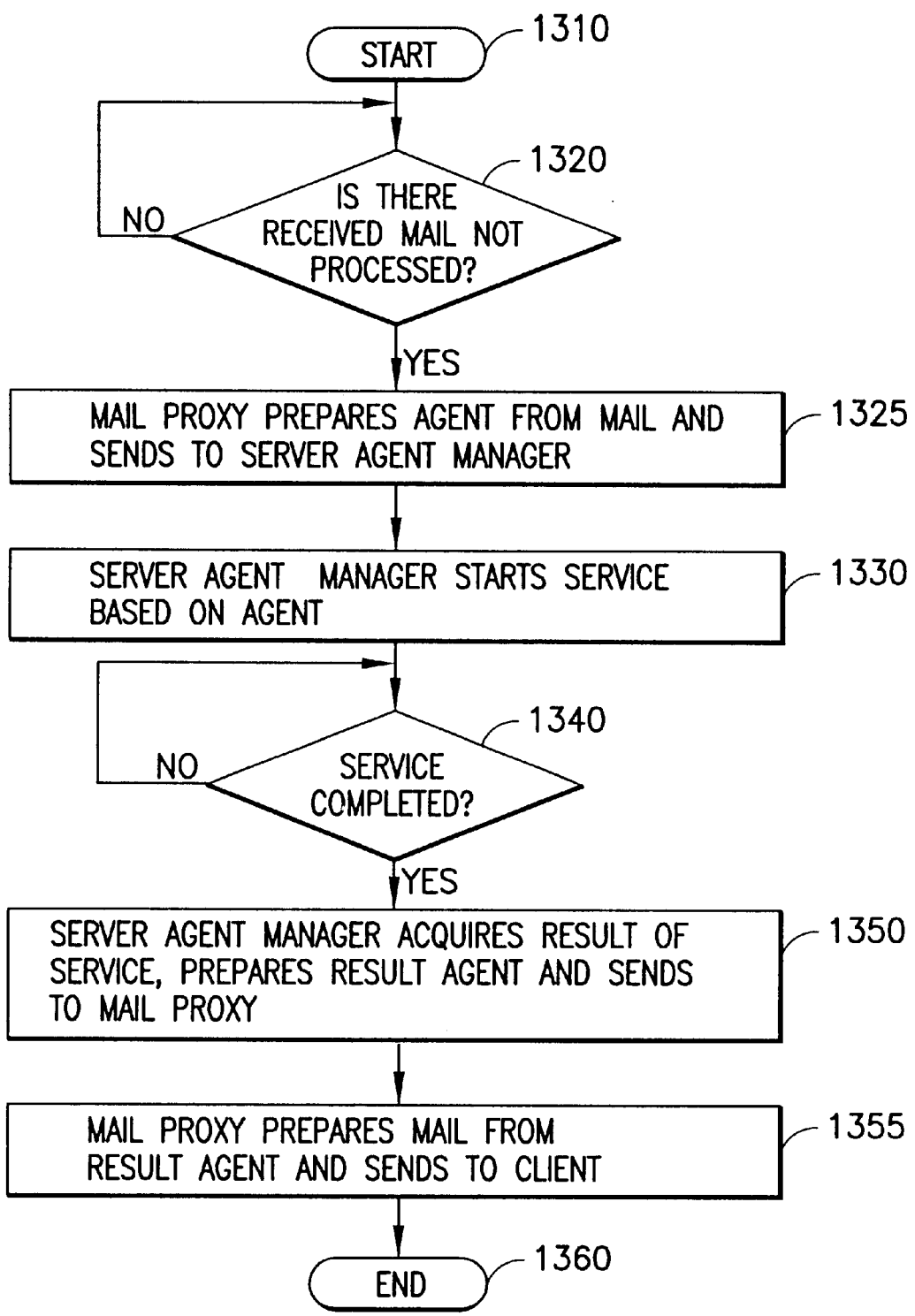
FIG. 13 is a flow chart showing a procedure of processing a display operation of a GUI on the server in the second embodiment of this invention.

Operation of the server 351 in FIG. 5 is now described with reference to FIG. 13.

In a block 1320, the mail proxy 530 on the server 351 checks to see whether or not there remains a mail message received from the client 301 that is not processed. The mail proxy 530 waits until another mail message is received. If there remains no mail messages not processed control moves along a "no" path back to the block 1320, while control moves along a "yes" path to a block 1325 if there remains a mail message that is not processed.

In the block 1325, the mail proxy 530 prepares an agent from the mail messages and sends it to the server agent manager 360. In a block 1330, the server agent manager 360 begins to execute a service based on the received agent by utilizing other necessary servers (581, 582, 583).

In a block 1340, the server agent manager 360 waits for completion of the service by moving along a "no" path back to the block 1340, and moves to a block 1350 when service is completed by moving along a "yes" path.

In the block 1350, the server agent manager 360 acquires the result of the completed service and prepares a result agent for sending it to the mail proxy 530. In a block 1355, the mail proxy 530 receives the result agent, extracts the result data from the result agent, and prepares a mail message containing it to send it to the client 301.

Figure 6:
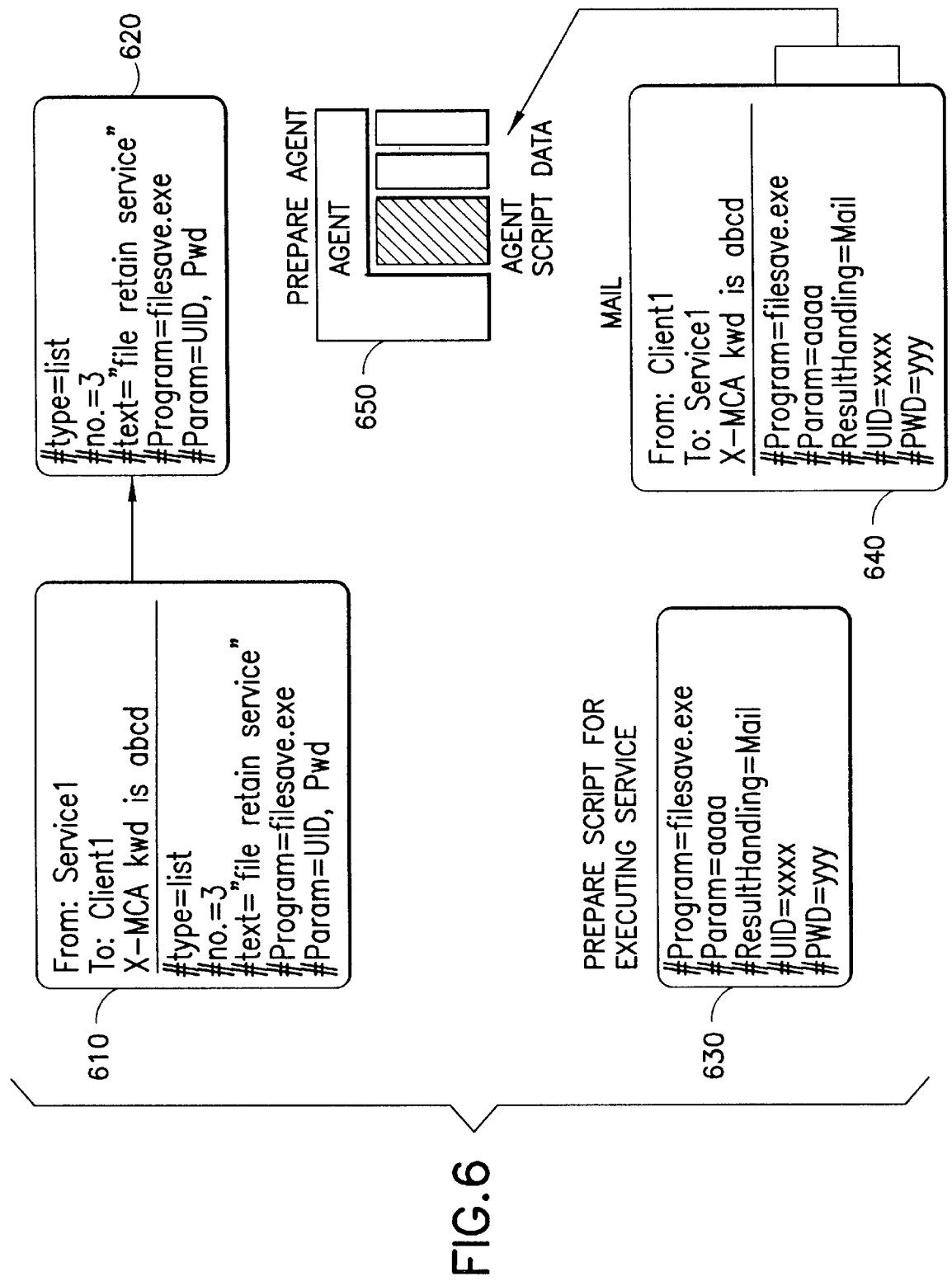
FIG. 6 is a data or a file form of the second embodiment of this invention.

FIG. 6 shows the form of data which is handled on the client and the server in the configuration shown in FIG. 5.

In FIG. 5, the form of data transferred between the server 351 and the client 301 takes the form of a mail message containing a script as shown by 610 in FIG. 6. Also in FIG. 5 the form of data 544 sent from the mailer 520 to the script interpretation part 320 takes the form of a script extracted from the mail message 610 of FIG. 6, as shown by block 620 of FIG. 6.

In FIG. 5, the form of data 545 which the script interpretation part 320, receiving an input from the user, transfers to the mailer 520 employs a service executing script form 630 (FIG. 6). The service executing script file 630 which the mailer 520 received from the script interpretation part 320 is converted to a mail message conforming to a mail protocol with a destination and a sender contained therein for sending from the client 301 to the server 351, at a block 640.

As seen from the above description using FIG. 6, it is a characteristic that a mail message form is used rather than an agent form in the configuration of FIG. 5 for data transfer between the server 351 and the client 301, while a script form is used for data transfer between the mailer 520 on the client 301 and the script interpretation part 320.

Figure 7:
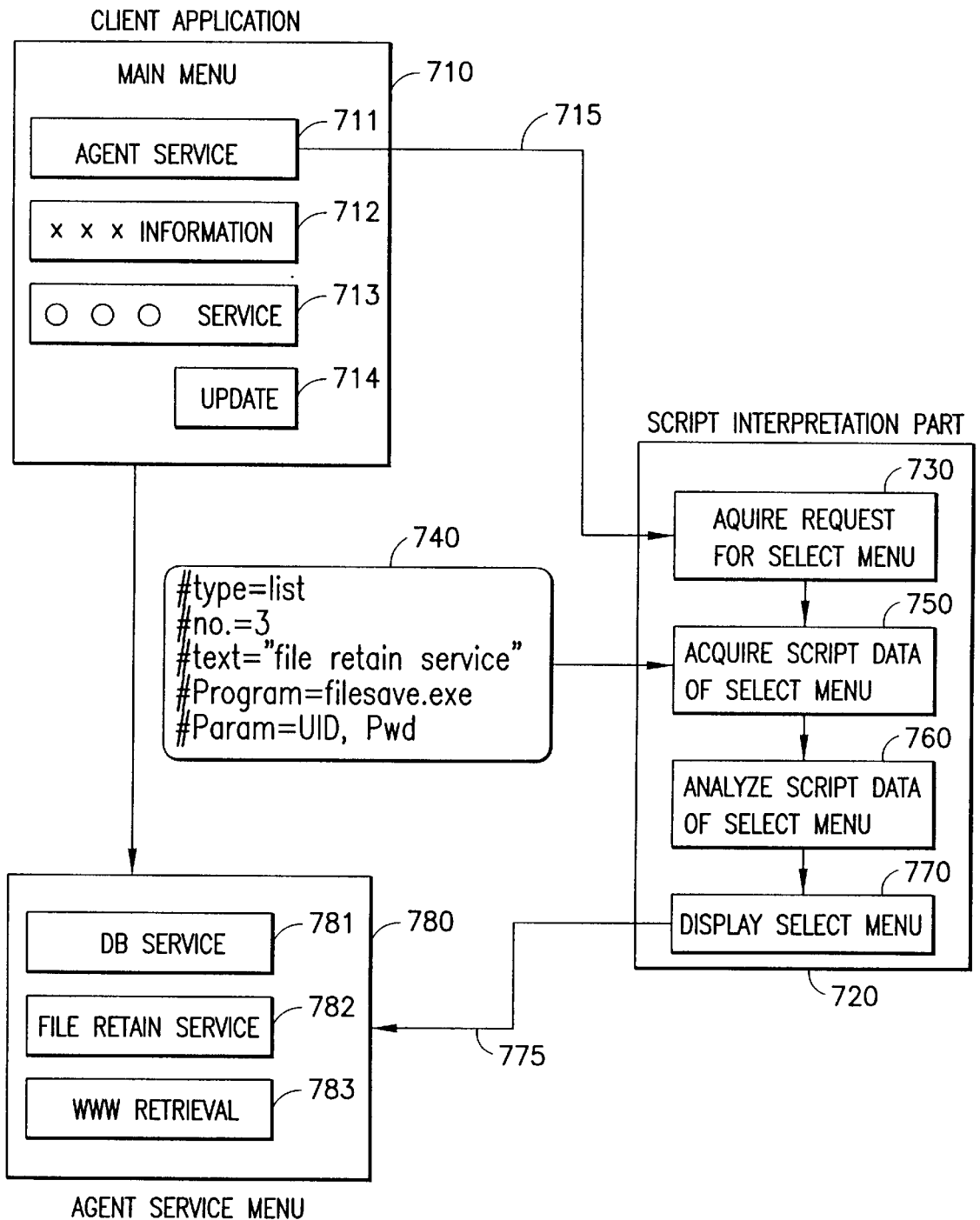
FIG. 7 is a diagram to show display operation of a GUI in one embodiment of this invention.
Figure 8:
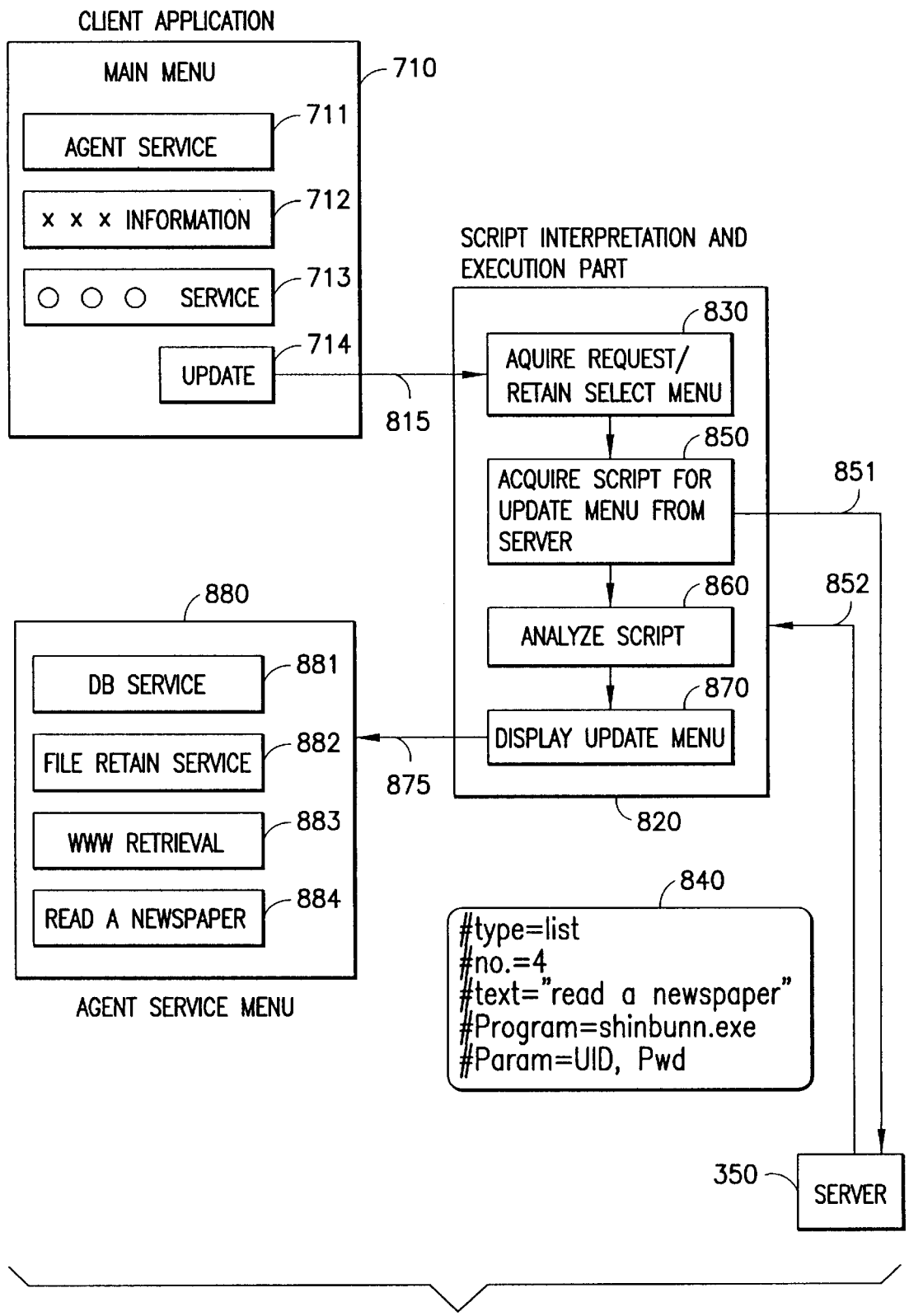
FIG. 8 is a diagram to show an update operation of the GUI in one embodiment of this invention.
Figure 9:
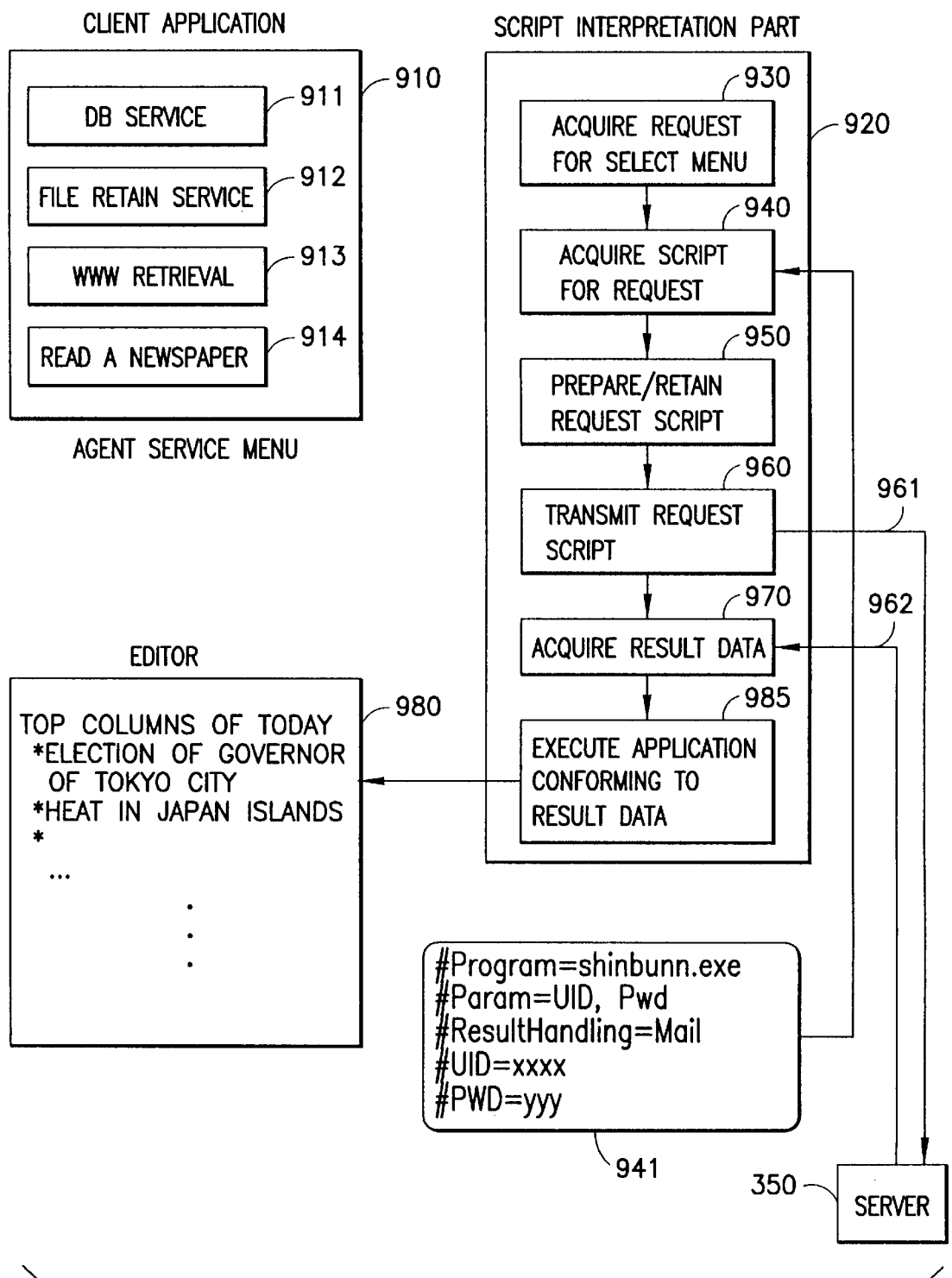
FIG. 9 is a diagram to show a request operation of the GUI in one embodiment of this invention.

FIG. 7, FIG. 8 and FIG. 9 show the processing and the operations that are performed for a user's request in the embodiments shown in FIG. 3 and FIG. 5, respectively.

FIG. 7 shows a local operation which may be processed only by the client 300 or 301 without the client 300 or 301 specifically exchanging with the server 350 or 351. In other words, the operation shown in FIG. 7 represents a case where a script corresponding to a user input request is found on the client 300 or 301 as a result of a retrieval (i.e., when the block 1054 in FIG. 10 or the block 1254 in FIG. 12 is "yes"). The block 710 in FIG. 7 shows a client application 310 in FIG. 3 or a service menu 510 in FIG. 5. They are hereafter simply referred to as a client application for simplicity.

The user selects a desired menu from the display menu 710. For example, the agent service 711 is selected by the user in this case. The script interpretation part 720 (which corresponds to the script interpretation part 320 in FIG. 3 and in FIG. 5) receives a request selected by a user and acquires the user selected menu request at a block 730. The script interpretation part 720 then retrieves a script correlated to the select menu involved and acquires a corresponding script 740 at a block 750. The script interpretation part 720 then analyzes data of script 740 relating to the menu selected by the user at block 760.

As a result, the script interpretation part 720 generates a GUI requested by the user and re-writes display of the client application from block 710 to block 780. The re-write process is represented by line 775. The GUI is locally changed by the above described series of operation and processing shown in FIG. 7.

FIG. 8 shows an operation to update a display of a client application by exchange between the client 300 or 301 and the server 350 or 351. In other words, the operation shown in FIG. 8 corresponds to a case where a script corresponding to the user input request was not found on the client as a result of the attempted retrieval (i.e., when the block 1054 in FIG. 10 or the block 1254 in FIG. 12 is "no").

A block 710, in FIG. 8, shows a client application 310 in FIG. 3 or a service menu 510 in FIG. 5. They are hereafter simply referred to as a client application for simplicity.

The user selects a desired menu from a displayed main menu at the client application 710. For example, an update 714 is selected by the user in this case. A script interpretation and execution part 820 (corresponding to the script interpretation part 320 in FIG. 3 and in FIG. 5) receives an update request 815 selected by a user involved. The script interpretation and execution part 820 acquires the user selected menu request, i.e. the update request 815, at a block 830.

The script interpretation and execution part 820 then stores a newly prepared menu request, at block 830, in the storage device 322 because it failed to find a corresponding script in the storage device 322. This menu request transfers the update request to the server by using a mail message or an agent represented by line 851.

The server 350 analyzes and processes the mail message or agent sent from the client 300 and transfers a script 840 containing the updated content of the GUI to the client 300. The transfer is represented by line 852. The script interpretation and execution part 820 on the client 300 stores the script 840 transferred from the server 350 and analyzes it at a block 860.

As a result of this analysis, the script interpretation and execution part 820 generates an updated GUI requested by the user and re-writes the display of the client application from block 710 to block 880. The re-write operation is represented by line 875.

The GUI is updated in cooperation with the server 350 by the above described series of operations and processing. In other words, the agent service menu 780 in FIG. 7 is updated into the agent service menu 880 in FIG. 8 by the above described series of operations.

FIG. 9 specifically shows the operation to process a request for displaying the client application by the exchange between the client 300 and the server 350. A block 910 in FIG. 9 shows a client application 310 in FIG. 3 or a service menu 510 in FIG. 5, which are hereafter simply referred to as a client application for simplicity.

The user selects a desired menu from the displayed menu at the block 910. For example, "read a newspaper" block 914 is selected by the user. The script interpretation part 920 (which corresponding to the script interpretation part 320 in FIG. 3 and in FIG. 5) receives the update request selected by a user involved and acquires the user selected menu request at block 930. The script interpretation part 920 then retrieves the memory or storage device for acquiring a script for the request relating to the "read a newspaper" request and acquires the corresponding request script 941 at a block 940. When the corresponding request script does not exist, the script interpretation part 920 prepares a request script, at block 950, to be sent to the server 350 based on the user selected menu request. The request script is also stored in the memory device for later use.

At the block 960, the script interpretation part 920 sends the prepared request script to the server 350 in the form of a mail message or an agent. This sending operation is represented by line 961. The server 350 analyzes and processes the mail message or the agent sent from the client 300 and transfers a resulting script containing the updated content of GUI to the client 300. The transfer operation is represented by line 962. The script interpretation part 920 on the client 300 sends the result data received from the server 350 to the script interpretation part, at a block 970.

The script interpretation part 920 displays a screen by using a user's request or the application requested by the result data (e.g., an editor) and re-writes the display of the result data from block 910 to block 980. The re-write operation is performed at a block 985.

The GUI is updated in cooperation with the server 350 by the above described series of operations and processing shown in FIG. 9.

Figure 14:
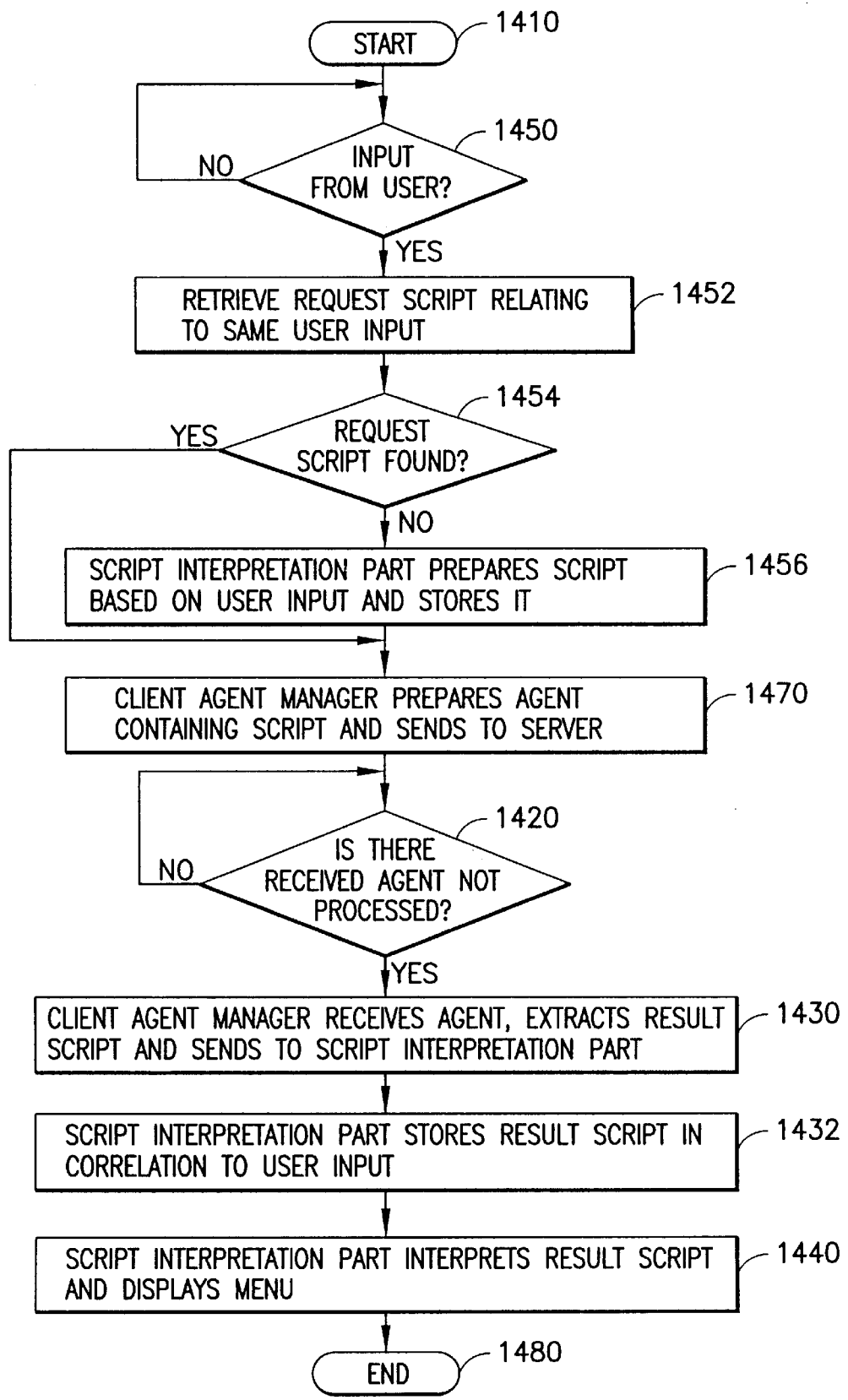
FIG. 14 is a flow chart showing a procedure of processing a display operation of a GUI on the client in the third embodiment of this invention.

FIG. 14 explains the operation of the client 300 in another embodiment of this invention. While the embodiment may be implemented in either of the configurations shown in FIG. 3 and FIG. 5, it is described by using a system which uses the agent of FIG. 3 for the simplicity of description.

In a block 1450, the script interpretation part 320 checks to see whether or not there is an input from the user for the menu now displayed. The script interpretation part 320 waits until an input from the user is received. If there is no input from the user, control moves along a "no" path back to the block 1450. However, control moves along a "yes" path to a block 1452 if an input is received from the user. In the block 1452, the script interpretation part 320 searches the storage device 322 to see if a request script relating to the same user input is stored therein.

At a block 1454 the result of the search, and attempted retrieval of the request script, is evaluated. In the block 1454, the script interpretation part 320 moves along a "yes" path to a block 1470 when the request script is found, i.e. the retrieval from the storage device 322 was successful. The script interpretation part 320 moves along a "no" path to a block 1456 when the request script is not found. In the block 1456, the script interpretation part 320 prepares a request script based on the input from the user, stores it in the memory device, and sends it to the client agent manager 330.

In a block 1470, the client agent manager 330 receives the request script, prepares an agent containing the request script, and sends it to the server 350. In a block 1420, the client 300 checks to see whether or not there remains an agent received from the server 350 that is not processed. The client 300 waits until another agent is received if there remains no agent not processed by moving along a "no" path back to the block 1420. Control, however, moves along a "yes" path to a block 1430 if there remains an agent that is not processed.

In the block 1430, the client agent manager 330 receives an agent which is not processed, extracts the result script and sends it to the script interpretation part 320. In a block 1432, the script interpretation part 320 stores the result script in the storage device 322 on the client in correlation to the user input.

In a block 1440, the script interpretation part 320 receives the result script, executes an interpretation of the result script, and displays a menu according to the result.

The above processes describe the operation in the side of the client in one embodiment. In this embodiment, the operation of the server side is similar to the operation of the server side in the embodiment as shown in FIG. 11.

According to the above described configuration of this invention, when a GUI corresponding to a same user input is stored on the client, a case where the communication channel is disconnected between the client and the server can be dealt with. In addition, a perceived advantage of the invention is that traffic over the communication channel can be reduced between the client and the server.

Although described in the context of preferred embodiments, it should be realized that a number of modifications to these teachings may occur to one skilled in the art. By example, and as discussed above, the teachings of this invention are not intended to be limited to any specific hardware or software configuration.

While the invention has been particularly shown and described with respect to preferred embodiments thereof, it will be understood by those skilled in the art that changes in form and details may be made therein without departing from the scope and spirit of the invention.

What is claimed is:

1. A method of updating a Graphical User Interface (GUI) on a computer, comprising the steps of:

acquiring an input for a menu request selected by a user;

retrieving a result script relating to the acquired input for the menu request on the computer; and wherein when the result script is not found on the computer as a result of the retrieval, the method including the further steps of:

preparing an electronic mail message containing the acquired input for the menu request for sending the electronic mail message to another computer;

receiving at the computer an electronic mail message containing a process result sent from the another computer;

extracting the result script from the mail message received from the another computer; and interpreting the extracted result script according to a predetermined rule and displaying a GUI based on the result of the interpretation.

2. A method as set forth in claim 1, wherein the step of extracting the result script from the received electronic mail message further includes a step of storing the extracted result script in correlation to the input for the menu request.

3. A method of updating a GUI on a computer, comprising the steps of:

acquiring an input for a menu request selected by a user;

retrieving a result script relating to the acquired input for the menu request on the computer; and wherein when the result script is not found on the computer as a result of the retrieval, the method including the further steps of:

preparing an agent containing the acquired input for the menu request for sending the agent to another computer;

receiving at the computer an agent containing a process result sent from the another computer;

extracting the result script from the agent received from the another computer; and interpreting the extracted result script according to a predetermined rule and displaying a GUI based on the result of the interpretation.

4. A method as set forth in claim 3, wherein the step of extracting the result script from the received agent further includes a step of storing the extracted result script in correlation to the input for the menu request.

5. A method of preparing a GUI on a client computer, comprising the steps of:

acquiring a menu request selected by a user;

retrieving a request script relating to the selected menu request;

preparing an electronic mail message containing the retrieved request script for sending the electronic mail message to a server computer;

receiving at the client computer an electronic mail message containing a reply to the electronic mail message from the server computer;

extracting a result script from the electronic mail message received from the server computer; and interpreting the extracted result script according to a predetermined rule to display a GUI based on the result of the interpretation.

6. A method of preparing a GUI on a client computer, comprising the steps of:

acquiring a menu request selected by a user;

retrieving a request script relating to the selected menu request;

preparing an electronic mail message by using the retrieved request script for sending the electronic mail message to a server computer when the request script is not found on the client computer as a result of the retrieval;

preparing a new request script from the selected menu request and preparing an electronic mail message containing the prepared request script for sending the electronic mail message to a server computer when the request script is not found on the client computer as a result of the retrieval;

receiving at the client computer an electronic mail message containing a reply to the electronic mail message from the server computer;

extracting a result script from the electronic mail message received from the server computer; and interpreting the extracted result script according to a predetermined rule to display a GUI based on the result of the interpretation.

7. A method as set forth in claim 6, wherein the step of preparing the new request script further comprises a step of storing the new request script.

8. A method of preparing a GUI on a client computer, comprising the steps of:

acquiring a menu request selected by a user;

retrieving a result script relating to the selected menu request;

preparing a request script by using the retrieved data;

preparing an agent containing the prepared request script for sending the agent to a server computer;

receiving at the client computer an agent containing a reply to the agent from the server computer;

extracting the result script from the result agent received from the server computer; and interpreting the extracted result script according to a predetermined rule and displaying a GUI based on the result of the interpretation.

9. A method of preparing a GUI on a client computer, comprising the steps of:

acquiring a menu request selected by a user;

retrieving a request script relating to the selected menu request;

preparing an agent by using the retrieved request script for sending the agent to a server computer when the request script is found on the client computer as a result of the retrieval;

preparing a new request script from the selected menu request and preparing an agent containing the prepared request script for sending the agent to a server computer when the request script is not found on the client computer as a result of the retrieval;

receiving at the client computer an agent containing a reply to the said agent from said server computer;

extracting a result script from the agent received from said server computer; and interpreting the extracted result script according to a predetermined rule to display a GUI based on the result of the interpretation.

10. A method as set forth in claim 9, wherein the step of preparing the new request further comprises a step of storing the new script.

11. An apparatus for updating a GUI on a computer, comprising:

means for acquiring an input for a menu request selected by a user;

means for retrieving a result script relating to said acquired input for said menu request on said computer; and means, responsive to a condition where said result script is not found on said computer as a result of said retrieval, for:

preparing a file containing said acquired input for said menu request for sending said file to another computer;

receiving at said computer a file containing a process result sent from said another computer;

extracting said result script from said file received from said another computer; and for interpreting said extracted result script according to a predetermined rule and display a GUI based on the result of said interpretation.

12. An apparatus as set forth in claim 11, wherein said means operative to prepare, receive, extract and interpret further comprises means operative to store said extracted result script in correlation to said input for said menu request.

13. A computer readable recording medium recording therein a program for updating a GUI on a computer, the program executing the steps of:

acquiring an input for a menu request selected by a user;

retrieving a result script relating to the acquired input for the menu request on the computer; and wherein when the result script is not found on the computer as a result of the retrieval, the program further executing steps of:

preparing an electronic mail message containing the acquired input for the menu request for sending the electronic mail message to another computer;

receiving at the computer an electronic mail message containing a process result sent from the another computer;

extracting the result script from the mail message received from the another computer; and interpreting the extracted result script according to a predetermined rule and displaying a GUI based on the result of the interpretation.

14. A computer readable recording medium recording therein a program for updating a GUI on a computer, the program executing the steps of:

acquiring an input for a menu request selected by a user;

retrieving a result script relating to the acquired input for menu request on the computer; and wherein when the result script is not found on the computer as a result of the retrieval, the program further executing the steps of:

preparing an agent containing the acquired input for a menu request for sending the agent to another computer;

receiving at the computer an agent containing a process result sent from the another computer;

extracting the result script from the agent received from the another computer; and interpreting the extracted result script according to a predetermined rule and displaying a GUI based on the result of the interpretation.

\* \* \* \* \*